(12) United States Patent
Varma et al.

(10) Patent No.: US 8,990,826 B2
(45) Date of Patent: Mar. 24, 2015

(54) SYSTEM AND METHOD FOR RECEIVING ANALYSIS REQUESTS AND CONFIGURING ANALYTICS SYSTEMS

(75) Inventors: Anil Varma, Clifton Park, NY (US); Nicholas Roddy, Schenectady, NY (US); Feng Xue, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 13/490,453

(22) Filed: Jun. 6, 2012

(65) Prior Publication Data

US 2013/0332935 A1   Dec. 12, 2013

(51) Int. Cl.
*G06F 9/46*   (2006.01)
*G06F 9/50*   (2006.01)
*G06F 11/30*  (2006.01)

(52) U.S. Cl.
CPC .............. *G06F 11/301* (2013.01); *G06F 9/50* (2013.01); *G06F 9/5011* (2013.01); *G06F 11/3051* (2013.01); *G06F 2201/875* (2013.01); *G06F 2209/501* (2013.01)
USPC ......................................................... 718/104

(58) Field of Classification Search
CPC ....................................................... G06F 9/52
USPC ......................................................... 718/104
See application file for complete search history.

(56) References Cited

U.S. PATENT DOCUMENTS

| | | | | |
|---|---|---|---|---|
| 2002/0169816 | A1* | 11/2002 | Meiri | 709/104 |
| 2007/0240161 | A1* | 10/2007 | Prabhakar et al. | 718/104 |
| 2009/0106320 | A1* | 4/2009 | Dageville et al. | 707/200 |
| 2009/0282272 | A1* | 11/2009 | Bestgen et al. | 713/320 |
| 2011/0167434 | A1* | 7/2011 | Gaist | 719/320 |
| 2011/0321055 | A1* | 12/2011 | Moore et al. | 718/104 |
| 2013/0067464 | A1* | 3/2013 | Shah | 718/1 |
| 2013/0080417 | A1* | 3/2013 | Kashyap | 707/718 |
| 2013/0152099 | A1* | 6/2013 | Bass et al. | 718/103 |
| 2013/0159286 | A1* | 6/2013 | Manzano Macho et al. | 707/718 |
| 2013/0173592 | A1* | 7/2013 | Yuan et al. | 707/719 |
| 2013/0318069 | A1* | 11/2013 | Alu et al. | 707/718 |

OTHER PUBLICATIONS

Sudhanva Gurumurthiy, Anand Sivasubramaniamy, Mahmut Kandemiry, Hubertus Frankez, DRPM: Dynamic Speed Control for Power Management in Server Class Disks, Jun. 9-11, 2003, IEEE, Proceedings of the 30th Annual International Symposium on Computer Architecture (ISCA'03).*

* cited by examiner

*Primary Examiner* — Emerson Puente
*Assistant Examiner* — Charlie Sun
(74) *Attorney, Agent, or Firm* — GE Global Patent Operation; Joseph A. Kramer

(57) ABSTRACT

A method for analyzing data is disclosed that includes receiving an analysis request to analyze selected data corresponding to one or more monitored assets, wherein the analysis request includes one or more parameters corresponding to performance categories of computing resources for processing the analysis request; determining a computing resource allocation plan for processing the analysis request based on the one or more parameters; and processing the analysis request using the determined computing resource allocation plan to provide analysis results. Also disclosed is an analytic router that includes a mapper, an estimator, an optimizer, and a resource provisioner.

22 Claims, 3 Drawing Sheets

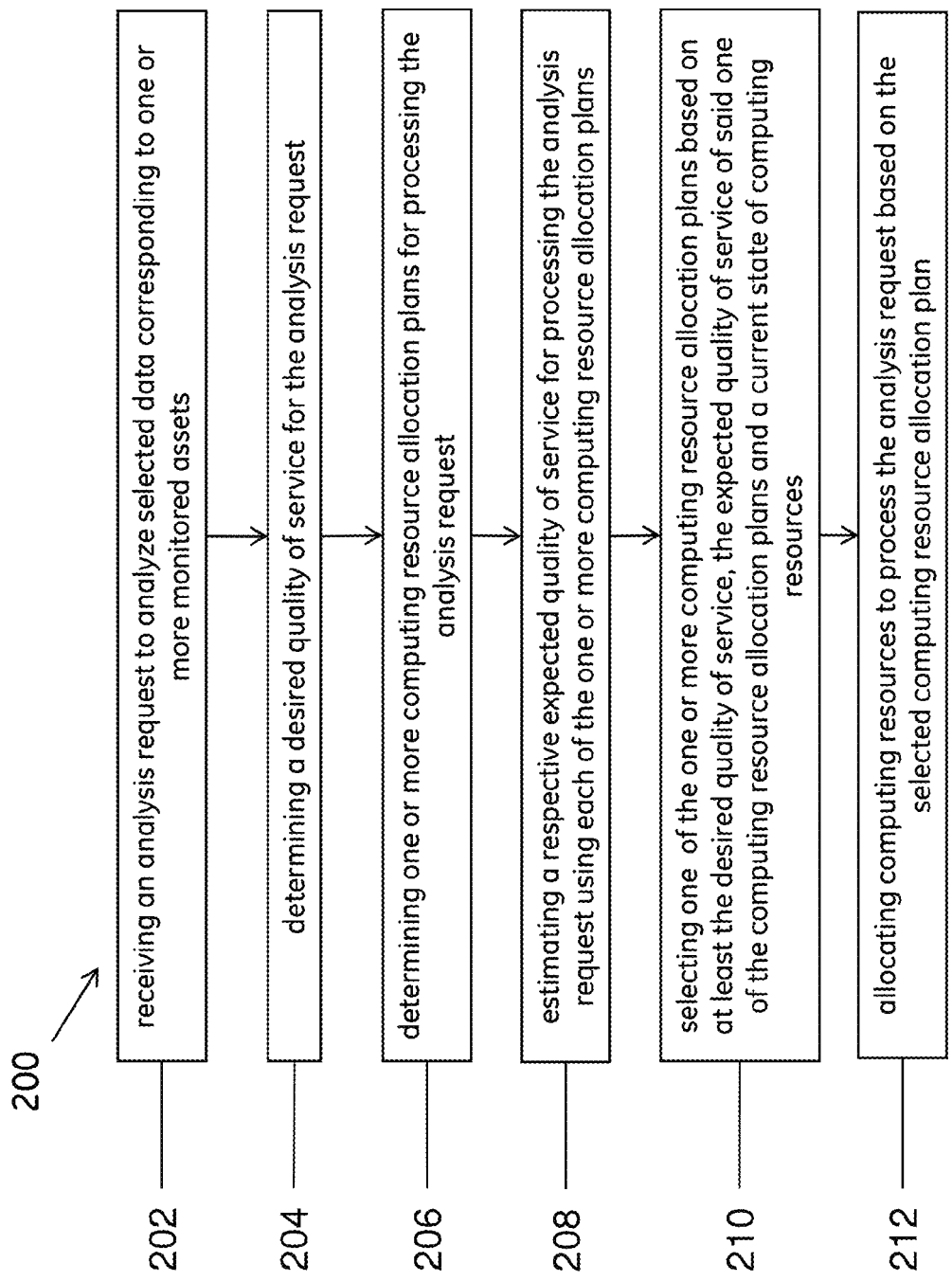

SYSTEM AND METHOD FOR RECEIVING ANALYSIS REQUESTS AND CONFIGURING ANALYTICS SYSTEMS

BACKGROUND

1. Technical Field

The subject matter disclosed herein relates to a configurable analytics system.

2. Discussion of Art

The efficient analysis of data has often required custom solutions for processing the type of data and the type of analysis requests in question. In addition, dedicated computing resources have often been needed to accommodate the highest urgency and the greatest demand expected. As processing demands increase, the cost of providing custom solutions using dedicated resources has created an impediment to efficient data analysis.

BRIEF DESCRIPTION

Presently disclosed is a method for computing. In an embodiment, the method includes receiving an analysis request to analyze selected data corresponding to one or more monitored assets, wherein the analysis request includes one or more parameters corresponding to performance categories of computing resources for processing the analysis request; determining a computing resource allocation plan for processing the analysis request based on the one or more parameters; and processing the analysis request using the determined computing resource allocation plan to provide analysis results.

Also disclosed is a method that includes receiving a plurality of analysis requests to analyze selected data corresponding to one or more monitored assets. Each analysis request includes one or more parameters corresponding to performance categories of computing resources for processing the analysis request. The method further includes, for each analysis request, determining a computing resource allocation plan for processing the analysis request based on the one or more parameters of the analysis request; and processing the analysis request using the determined computing resource allocation plan to provide analysis results corresponding to the analysis request.

Also disclosed is a method including receiving an analysis request to analyze selected data corresponding to one or more monitored assets; determining a desired quality of service for the analysis request; determining one or more computing resource allocation plans for processing the analysis request; estimating a respective expected quality of service for processing the analysis request using each of the one or more computing resource allocation plans; selecting one of the one or more computing resource allocation plans based on at least the desired quality of service, the expected quality of service of said one of the computing resource allocation plans, and a current state of computing resources; and allocating computing resources to process the analysis request based on the selected computing resource allocation plan.

Also disclosed is an analytic router. In an embodiment, an analytic router includes a mapper configured to determine a desired quality of service for an analysis request, wherein the analysis request comprises a request to analyze selected data corresponding to one or more monitored assets; an estimator configured to determine one or more computing resource allocation plans for processing the request, wherein the estimator is further configured to estimate a respective expected quality of service for processing the analysis request using each of the computing resource allocation plans; an optimizer configured to selecting one of the computing resource allocation plans based on at least the desired quality of service, the expected quality of service and a current state of computing resources; and a resource provisioner configured to allocate computing resources to process the analysis request based on the selected computing resource allocation plan.

In another embodiment, an analytic router includes means for receiving an analysis request to analyze selected data corresponding to one or more monitored assets, wherein the analysis request includes one or more parameters corresponding to performance categories of computing resources for processing the analysis request; means for determining a computing resource allocation plan for processing the analysis request based on the one or more parameters; and means for processing the analysis request using the determined computing resource allocation plan to provide analysis results.

Other embodiments relate to an analytics computing system comprising an analytic router as described herein and/or configured to implement one or more of the methods described herein.

BRIEF DESCRIPTION OF THE DRAWINGS

Reference is made to the accompanying drawings in which particular embodiments and further benefits of the invention are illustrated as described in more detail in the description below, in which:

FIG. 3 is a flowchart of a second embodiment of a method for processing an analysis request.

DETAILED DESCRIPTION

Embodiments of the subject matter disclosed herein relate to a configurable analytics system for maintenance and diagnostics of monitored assets. The disclosed subject matter further relates to a situation-aware configurable cloud-based analytics system for analyzing data from a plurality of monitored assets. The decreasing cost for communicating and processing data has created an opportunity for data to be collected and analyzed to provide insights on the health of individual assets. This aggregation of data facilitates remote maintenance and diagnostics for the individual monitored assets as well as improved management of a fleet of assets. For example, by monitoring the health of a fleet of assets, such as locomotives or other rail vehicles, assets may be selected for specific tasks based on the relative health of the assets or their fitness for a given task or assignment.

As described herein, a monitored asset includes any asset from which data may be generated. In some embodiments, the monitored assets are mobile assets such as locomotives, airplanes, construction vehicles, and/or automobiles. In other embodiments, the monitored assets are fixed assets such as wind turbines, power generators, and/or manufacturing equipment. A fixed asset refers generally to an asset that is stationary during operation, although the asset may be movable between operations, such as portable HVAC systems or backup generators. The monitored asset may also include a variety of different asset types. For example, the monitored assets may include a plurality of locomotive engines as well as a plurality of railroad crossing gates. In yet other embodiments, the monitored assets may include one or more subsystems. A locomotive, for example, may have cooling systems, braking systems, turbocharger systems, and communication systems each of which may constitute a monitored asset. An airplane, for example, may have hydraulic systems, communication systems, navigation systems, radar systems, and one or more systems corresponding to each of the engines, each of which may constitute a monitored asset. These and other systems may be treated as a monitored asset either individually or aggregated in a logical grouping, such as on a per vehicle basis. The monitored fixed assets may similarly have one or more systems or sub-systems that may be monitored either individually or in the aggregate as appropriate for a given application. Thus, unless otherwise specified, references to monitored assets herein includes the assets being different from one another, the same as one another, or some combination thereof (e.g., some monitored assets are the same whereas others are different from one another).

Figure 1:
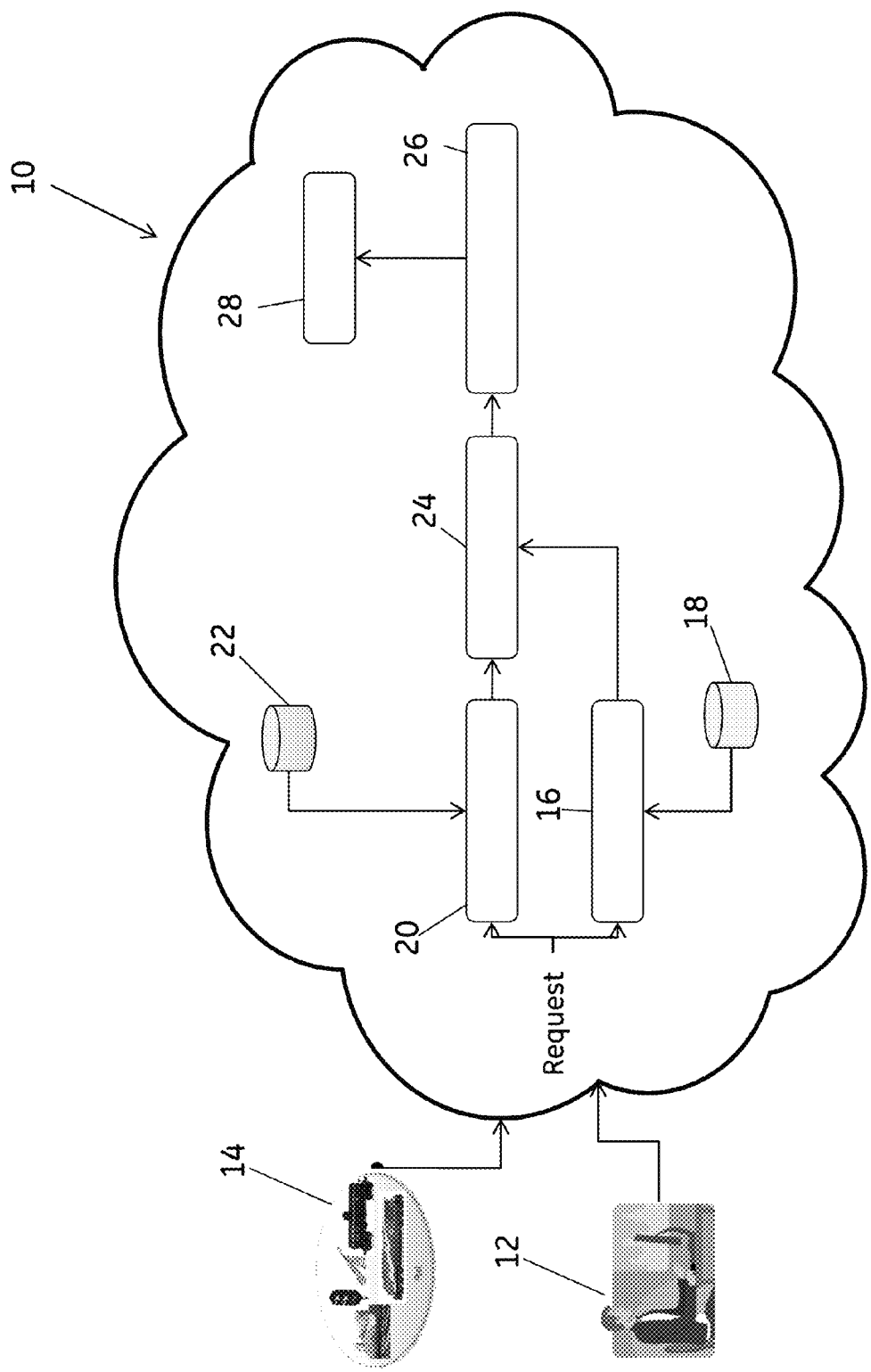
FIG. 1 is a schematic view of an analytics system.

Referring now to FIG. 1, a schematic illustration of an embodiment of an analytic router 10 is depicted. An analytic router may be characterized as a computing resource including hardware and/or software resources for implementing the methods presently disclosed. In embodiments, the analytic router is implemented solely in hardware, solely in software, or more commonly, as a combination of hardware and software resources configured to provide the desired functionality. The analytic router may also be implemented in dedicated hardware or software or may be implemented in a distributed manner across one or more hardware and software resources. A distributed implementation may be especially useful when the analytic router is employed in a cloud computing environment having a plurality of computing resources that are allocated as needed for specific tasks, such as analysis requests.

In an embodiment, the analytic router 10 includes means for receiving an analysis request to analyze selected data corresponding to one or more monitored assets. The means for receiving the analysis request includes computing resources configured to communicate with users 12 and/or monitored assets 14. In some embodiments, the analytic router 10 includes a quality of service mapper 16 (also referred to herein as the mapper) which is configured to determine a desired quality of service for an analysis request. The analytic router includes a quality of service estimator 20 (also referred to herein as the estimator) which is configured to determine an expected quality of service for processing the analysis request using a given computing resource allocation plan. In this context, a computing resource allocation plan includes a designation of hardware and/or software resources capable of performing the requested analysis. Due to the multiple combinations of hardware and software resources that may be utilized, the respective expected quality of service may be different for each computing resource allocation plan identified. In embodiments, the analytic router 10 also includes a quality of service optimizer 24 (also referred to herein as the optimizer) which is configured to select a computing resource allocation plan from among several computing resource allocation plans to achieve a desired quality of service. Although illustrated as separate elements in FIG. 1, the mapper 16, estimator 20, and optimizer 24 may be implemented and used either individually or in combination. In each embodiment, one or more of the mapper, estimator, and optimizer provide means for selecting a computing resource allocation plan based on at least a desired quality of service for the analysis request, an expected quality of service for processing the analysis request using the selected computing resource allocation plan, and a current state of the computing resources. In one embodiment, the mapper determines the desired quality of service for the analysis request while the estimator determines the computing resources required to achieve the desired quality of service for that analysis request. In an embodiment, the optimizer 24 determines the current state of the computing resources but in other embodiments, the current state of computing resources is provided to the analytic router for use in selecting a computing resource allocation plan.

Once a computing resource allocation plan is selected, the analysis request is routed to the selected computing resources. In embodiments, the analytic router 10 includes a resource provision module 26 (in embodiments, also referred to herein as the resource provisioner) which provides means for routing the analysis request to computing resources to process the analysis request to achieve the desired quality of service based on the selected computing resource allocation plan. In embodiments, the resource provision module 26 receives the selected computing resource allocation plan and allocates the computing resources to process the analysis request, such as using an analysis module 28. The analysis module 28 provides means for processing the analysis request on the selected data to create the desired analysis result. Allocating computing resources may include sending instructions for selected hardware and software resources to begin processing an analysis request. In other embodiments, allocating computing resources includes scheduling or queuing the analysis request for later processing once a given hardware or software resource becomes available. In an embodiment, the analysis request is scheduled for processing at a determined lime, such as off-peak hours when demand on the computing resources is reduced. In this manner, the analytic router 10 provides the technical effect of efficiently allocating computing resources for processing the analysis request while providing flexibility for processing multiple analysis requests of varying urgency or priority.

The analytic router 10 may include or be configured to access a quality of service configurations module 18. In embodiments, the quality of service configurations module 18 correlates types of requests with different quality of service levels. For example, quality of service configurations module 18 may associate analysis of real-time data from monitored assets with a high priority quality of service so that developing faults may be quickly identified and reported to prevent further degradation or damage to the monitored asset. In contrast, user-initiated requests for analysis of historical data may be associated with a low priority quality of service when processing time is not a significant factor. In embodiments, the analytic router 10 also includes means for overriding the quality of service mapper and/or the quality of service configurations module 18 so that a desired quality of service may be specified in the request, such as when a user requires a faster response than would otherwise be provided by the system. In some embodiments, the quality of service configurations module 18 may include a rules engine configured to implement one or more rules for determining the quality of service desired for requests based on the type of request, the originator of the request, or parameters included in the request or previously established for the system.

The analytic router 10 may also include or be configured to access a historical performance module 22. The historical performance module 22 contains historical performance results, such as the actual quality of service achieved for processing a given analysis request. In one embodiment, the historical performance results may include the actual processing time required to process a prior analysis request using a given computing resource allocation plan. This historical performance information may be accessed by the estimator 20 to determine the expected quality of service for processing a subsequent analysis request. In this manner, the analytic router may achieve the technical effect of improving the accuracy of the expected quality of service as requests are processed thereby improving the overall efficiency of the analysis system.

The analytic router 10 as illustrated in FIG. 1 includes multiple components or modules, such as the mapper 16, the estimator 20, the optimizer 24, and the resource provision module 26. These components have been illustrated schematically to assist in explaining the various functionalities of the analytic router, but such illustration does not limit the implementation or functionality of the analytic router. As noted above, the analytic router may be implemented using hardware resources, software resources, or combinations of hardware and software resources. Each of the components may similarly be implemented using hardware, software, and combinations thereof. In addition, the illustrated components may be merged or partitioned as desired based on a given implementation strategy without departing from the scope of the present disclosure. In one embodiment, the analytic router 10 is implemented in software and each of the components and functions disclosed here is embodied in the software forming the analytics router.

Figure 2:
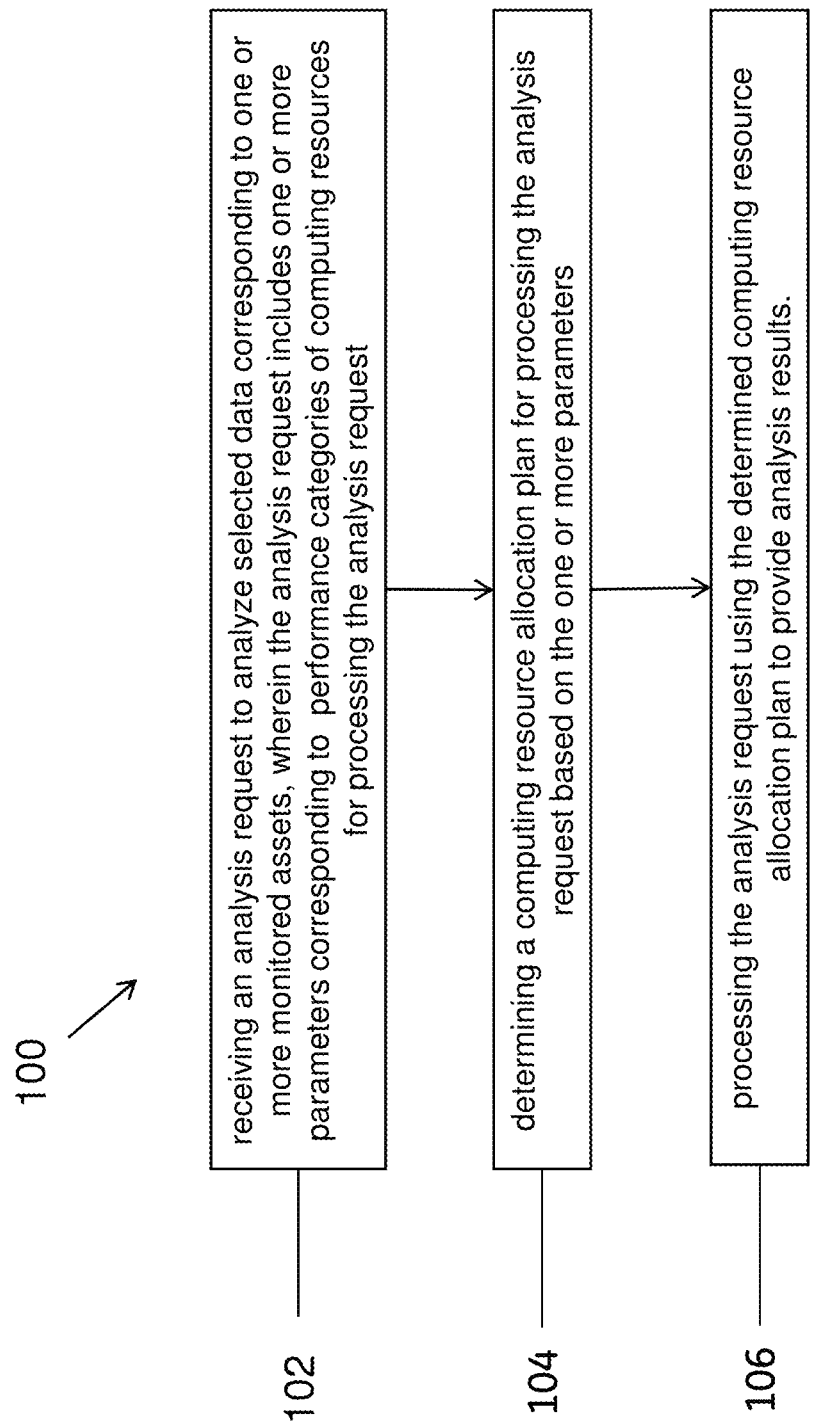
FIG. 2 is a flowchart of a first embodiment of a method for processing an analysis request.

Referring now to FIGS. 2 and 3, embodiments of methods for processing analysis requests are illustrated. In the embodiment of FIG. 2, the method 100 includes the step 102 of receiving an analysis request to analyze selected data corresponding to one or more monitored assets. The analysis request includes one or more parameters corresponding to performance categories of computing resources for processing the request. The method also includes the step 104 of determining a computing resource allocation plan for processing the analysis request based on the one or more parameters, and the step 106 of processing the analysis request using the determined computing resource allocation plan to provide analysis results. In this manner, the computing resources for processing the request are selected based on parameters provided with the request that correspond to performance categories of the computing resources.

In the embodiment of FIG. 3, as described further below, a desired quality of service for an analysis request may be determined based on the type of analysis requested, the selected data, or other properties of the analysis request. The desired quality of service may be determined based on these factors, as well as the parameters specified in the analysis request. In other embodiments, the analysis request does not include parameters corresponding to performance categories and the desired quality of service is determined based on the analysis request without the use of such parameters. In an embodiment, a method 200 of processing an analysis request includes the step 202 of receiving an analysis request to analyze selected data corresponding to one or more monitored assets, and the step 204 of determining a desired quality of service request for the analysis request. The method 200 further includes the step 206 of determining one or more computing resource allocation plans for processing the analysis request, and the step 208 of estimating a respective expected quality of service for processing the analysis request using each of the one or more computing resource allocation plans. The method also includes the step 210 of selecting one of the one or more computing resource allocation plans based on at least the desired quality of service, the expected quality of service of said one of the computing resource allocation plans, and a current state of a computing resource, and the step 212 of allocating computing resources to process the analysis request based on the selected computing resource allocation plan.

In embodiments, the request may originate from a variety of clients of the system. The term client may refer broadly to an entity originating a request. In one embodiment, the client is a user (e.g., a person) that desires to perform an analysis. In other embodiments, the client is a monitored asset, such as a locomotive. In one example, a controller on the locomotive receives and transmits data from a monitored system, such as engine temperature data, along with a request to analyze the data to determine if a problem or fault exists. If a fault condition is identified in the data, such as an over-temperature condition, the operator of the monitored asset is notified so that appropriate action may be taken. The method thereby reduces the local processing demand on a monitored asset. Alternatively, the method allows for distribution of the data processing requirements between the monitored asset and a remote location. In another example, the client may transmit an analysis request to determine trends in monitoring data for the monitored asset. For example, a locomotive may transmit data on fuel consumption to a remote server for storage. The locomotive, or another client, may then periodically request an analysis of the fuel consumption data. If the analysis reveals a trend in the fuel consumption data, such as declining fuel consumption over time, the operator of the monitored asset and/or maintenance personnel may be alerted to the condition so that appropriate action may be taken.

The selected data to be analyzed in accordance with the method may include a variety of types of data from which analysis results may be determined. In an embodiment, the analysis request includes the data to be analyzed. In other embodiments, the analysis request includes a pointer to the selected data, such as data stored in a database accessible by the system.

In one embodiment the selected data is real-time monitoring data from a monitored asset. As discussed above, the selected data may be monitoring data, such as engine temperature data, reported by the monitored asset. An asset may report such data in real-time. As used herein, real-time is not limited to instantaneous reporting, and allows for the typical delay associated with the efficient collection and transmission of data, as well as periodic reporting at a high frequency relative to the condition being monitored. In one example, analysis of real-time data may be needed for operational parameters that may change quickly within a short time period, such as the speed of turbines or output of generators in a power generation facility. The real-time data may therefore be used to analyze and respond to time sensitive conditions of the monitored assets.

In contrast to real-time monitoring data, in another embodiment, the selected data is historical monitoring data from one or more monitored assets. The monitored data from one or more monitored assets may be accumulated over time. An analysis of the historical data may then be conducted to identify trends. In one example, the trends of fuel consumption may be assessed from historical data for a given vehicle. In another example, the fuel consumption may be assessed from historical data for a fleet of vehicles to identify variations in the performance of the vehicles in the fleet either over time or over different operating conditions or locations. The ability to analyze historical data for a fleet of monitored assets, whether fixed or mobile, may provide insights not visible when analyzing data from a single member of the fleet.

The selected data may be raw measurement data, such as actual pressure values, rotational speeds, or power outputs. The selected data may be generated by sensors, detectors or other measurement equipment, but may also include observational data recorded by operators or other personnel responsible for the monitored assets. In some embodiments, the selected data may be processed data, where processed data is the result of at least some processing prior to the analysis request. In one example, a locomotive is configured to identify an over temperature condition, when the engine temperature exceeds a given threshold. The fact that an over temperature condition occurred may be reported as monitored data for the monitored asset, i.e. the locomotive, along with other information corresponding to the state of the locomotive at the time the over temperature condition was reported. The other information may include operational data, such as engine speed, environmental data, such as ambient temperature or pressure, or logistical data, such as time, date, operator, and geographic location. An analysis of the occurrence of over temperature conditions may be performed on the historical data collected. If a correlation is uncovered between the occurrence of over temperature conditions and one or more factors, appropriate changes or corrective action may be implemented.

In many embodiments, the monitored data from the monitored assets is available from a database or other data storage device either integrated with or accessible to the system used in performing the methods described here. In other embodiments, the selected data is supplied by the client submitting the analysis request. For example, a client, such as a monitored asset, may supply measurement data along with a request to process that data. Alternatively, a client, such as a user, may supply data from another data source, such as previously collected data on one or more assets. In this manner, the methods and systems described herein provide the technical effect of processing selected data either from within an integrated system or as a standalone application that may be used by a plurality of clients for a plurality of types of data.

In embodiments, the analysis request includes one or more parameters corresponding to performance categories of computing resources for processing the analysis request. As noted above, the processing of analysis requests relies upon computing resources, namely hardware and software resources that may be used to perform the computations necessary to produce the analysis results. The systems and methods presently disclosed efficiently allocate computing resources for processing the analysis request while providing flexibility for processing multiple analysis requests of varying urgency or priority.

In various embodiments, the performance categories of the computing resources may be defined in terms of performance attributes, such as the time for processing a request or the cost of processing a request. Often tradeoffs between time and cost are possible due to the varying demands on computing resources. In one example, the computing resource may be a cloud computing environment hosted by a service provider. The service provider may charge a premium rate for use of the cloud computing system during business hours when demand is high, and charge a lower rate for use of the system during off-hours when demand is low. In one example, the parameters of the analysis request may specify that the time to process the request is a low priority and that minimizing processing cost is a high priority. The analysis request is then scheduled to run during the off-peak hours when the processing costs are less. However, if the system has spare computing resources those resources may be allocated to process the request, while perhaps charging a discounted rate. In one embodiment, the system continues to process the analysis request unless or until another higher priority request is received for which the premium rate may be charged, thereby allowing the system to maintain optimum utilization within the constraints established by the parameters of the various requests. In another example, the parameters of the analysis request may specify that the time to process is a high priority, i.e., the analysis results are needed quickly, and the system will process the request as quickly as possible even if the processing costs are higher. In some embodiments, the computing resources also perform services other than the methods disclosed herein and the analysis requests of the present disclosure are balanced or sequenced with these other demands on the computing resources. In this manner, the technical effects of balancing competing priorities in the allocation of computing resources and improving utilization of the computing resources are achieved.

In other embodiments, the performance characteristic of interest is a quality metric for the analysis results. In embodiments, a quality metric relates to the accuracy of the analysis results. For example, a parameter of the analysis request may specify that accuracy is a high priority. In an analysis routine that includes sampling of data, a request for increased accuracy may result in additional computing resources being assigned to process a larger sample of the data to improve the accuracy of the results. Similarly, the quality metric may correspond to minimization of false alarms. Minimizing false alarms may similarly require the allocation of additional computing resources. Alternatively, a false alarm minimization requirement may result in the system applying a different analysis algorithm with a lower probability of erroneously reporting a false alarm. In yet another embodiment, the quality metric is a specified confidence interval and the system continues to process the selected data until the analysis results are within the confidence interval specified. In yet another embodiment, the quality metric indicates that time-based behavior (e.g., trends) are to be emphasized and appropriate software resources are selected to perform the analysis. In still yet another embodiment, the performance characteristic is an indication that the intermediate result of the analysis should be reported as the analysis progresses. Each of the performance categories may correspond to one or more parameters, and similarly, one or more parameters may be used to specify the limitations or objectives for the performance categories. In this manner, the analysis request includes parameters corresponding to the desired performance characteristics for processing the request and the system uses the parameters specified to determine a computing resource allocation plan for processing the request. Both the client and the system are therefore provided with increased flexibility in the generation and processing of a plurality of analysis requests.

In some embodiments, the step of determining a computing resource allocation plan further includes determining a desired quality of service for the analysis request. In embodiments, the desired quality of service is determined based on the one or more parameters. The desired quality of service for an analysis request represents one or more performance characteristics for processing the analysis request. In embodiments, the desired quality of service is one of the parameters specified in the analysis request. In other embodiments, the desired quality of service is determined by the system using the parameters specified in the request. For example, the quality of service may be a function of the maximum computing cost permitted for the analysis, or a function of the maximum time allowed for completing the analysis. In other examples, the quality of service is a function of both the maximum cost and maximum time. The quality of service may also be a function of other performance characteristics of the computing resources. Still other embodiments include determining the quality of service from a rules engine that correlates request types with quality of service levels. As discussed above, the rules engine may be provided in a quality of service configuration module and may utilize one or more components of the analysis request to map the request to a desired quality of service. For example, the rules engine may consider the type of analysis to be performed, the type of data to be analyzed, the identity of client making the request, the parameters specified in the analysis request, and other components of the request to appropriately map the request to a desired quality of service. In this manner, the quality of service facilitates making tradeoffs between different performance characteristics by establishing a relative importance of the characteristics based on the parameters specified by the client in the analysis request.

The method may also include determining the computing resources required to achieve the desired quality of service for the analysis request. Once a quality of service is determined, such as based on the time and cost for processing a request, the computing resources necessary to achieve the desired quality of service may be calculated. In one example, if the desired quality of service corresponds to a constraint that the request be processed within a given time, such as no more than 3 hours, the number of computing resources necessary to perform the analysis of the selected data within that time constraint may be determined. The determination may be used to establish a minimum computing resource allocation plan. If the available resources of the system are insufficient to satisfy such a minimum computing resource allocation plan, an alert is generated to inform the client that the analysis request cannot be processed in accordance with the parameters specified in the analysis request or the desired quality of service for the request cannot be achieved. By alerting the user to the limitation of the computing resources, the client is given the option of relaxing the requirements specified in the analysis request, such as allowing a higher cost to shorten the processing time or selecting a smaller data set on which to perform the analysis. Alternatively the client may send the request to a different service provider with sufficient computing resource capacity to process the analysis request based on the parameters and quality of service required for the request.

In an embodiment, the method also includes determining one or more computing resource allocation plans for processing the analysis request and estimating an expected quality of service for processing the analysis request using each of the computing resource allocation plans. The computing resource allocation plan is an identification of a collection of hardware resources and software resources among the available computing resources that are capable of performing the requested analysis. Whereas the computing resource allocation plan required to achieve the desired quality of service for the analysis request may represent a minimum allocation of resources, other identified computing resource allocation plans may represent one or more options identified as capable of processing the analysis request regardless of whether the quality of service would be achieved. In another embodiment, only computing resource allocation plans that meet the minimum requirements to achieve the desired quality of service are identified.

In embodiments, an expected quality of service for processing the analysis request using each of the computing resource allocation plans is determined. The respective expected quality of service for each of the computing resource allocation plans is an estimate of the quality of service likely to be realized if the analysis request is processed using the given computing resource allocation plan. In one embodiment, the expected quality of service is compared to the desired quality of service, and those allocation plans that would not meet the desired quality of service are excluded from consideration. In other embodiments, a respective expected quality of service is determined for each of a plurality of computing resource allocation plans. The respective expected qualities of service are compared and the computing resource allocation plan that has the best expected quality of service is selected based on the requirements of the application. The expected quality of service may encompasses factors such as time, cost, quality metrics or other performance characteristics in the same manner as the desired quality of service discussed above. In this way, the expected quality of service can be compared to the desired quality of service to facilitate selection of a computing resource allocation plan.

In another embodiment, the computing resource allocation plan is determined based on previously stored historical performance results associated with prior analysis requests. Historical performance results may include data on the performance characteristics achieved for prior analysis requests using given computing resource allocation plans. The historical performance results may include data on processing time, processing costs, quality metrics or other factors that correspond to parameters specified in the analysis request or to the determination of a desired quality of service. The historical performance data may also include actual quality of service data determined from the performance characteristics achieved when processing prior analysis requests. These historical performance results may be used alone or in combination with the one or more parameters of the analysis request to determine a computing resource allocation plan appropriate for the current analysis request. Over time, the historical performance results associated with an analysis request are stored to create a database of actual performance results. In one example, the historical performance results are used directly to identify a computing resource allocation plan capable of performing a given analysis. Alternatively, the historical performance results may be used to refine the determination of the expected quality of service for a given allocation plan so that more accurate estimates may be prepared. As the collection of historical performance results is developed, the determination of computing resource allocation plans may be refined based on the historical information. The system may therefore continue to learn and improve its performance as each analysis request is processed. Moreover, as the available computing resources change over time, the system may adapt as new allocation plans are found to be more efficient or otherwise preferable to those used previously.

As described above, a computing resource allocation plan is selected to process the analysis request using the identified computing resources. The selection of a computing resource allocation plan may be improved or optimized to improve such factors as efficiency of the system and/or performance for the client. In some embodiments, optimization may include modifying a computing resource allocation plan to achieve an expected quality of service that is at good as possible within the constraints of the system. In other embodiments, optimization includes modifying a computing resource allocation plan to improve the performance or expected performance of the computing resource allocation plan for processing the analysis request, were the performance is measured in terms of processing time, processing cost, accuracy of the analysis results, or other desired metrics. In an embodiment, the computing resource allocation plan may be selected based on the one or more parameters specified in the analysis request and an expected quality of service of one or more computing resource allocation plans. In another embodiment, the computing resource allocation plan may be selected based on a desired quality of service for the request and an expected quality of service for one or more computing resource allocation plans. Each embodiment utilizes at least information regarding the performance characteristics identified as relevant to the request and an estimate of the performance that may be achieved with a given computing resource allocation plan.

The current state of the computing resources may also be used in selecting a computing resource allocation plan. In embodiments, the current state of computing resources is used in combination with one or more of the parameters specified in the request, the desired quality of service, and an expected quality of service to select the computing resource allocation plan. The state of the computing resources may be determined by the system or provided to the system. In either case, the current state of the computing resources represents the current utilization of the computing resources for performing an analysis or other task. In embodiments, the current state of the computing resources also includes the currently planned or scheduled tasks to be performed by the computing resources. The current state of computing resources may be used in multiple was to select a computing resource allocation plan. In one embodiment, the current state is one factor used to determine the expected quality of service for a given computing resource allocation plan. If the computing resources are currently fully utilized and will remain fully utilized for an extended period of time, the expected quality of service would be low if the time to complete the analysis is a factor. In other embodiments, the current state of computing resources is used to select between multiple computing resource allocation plans each of which would provide at least the desired quality of service. For example, a first allocation plan may specify using a large number of hardware resources for a short period of time to complete an analysis, whereas a second allocation plan may specify using a limited number of hardware resources for a longer period of time to complete an analysis. If the current state of utilization of the computing resources is low, the first plan may be preferred even if the time to process the request was not a significant factor in the desired quality of service. In contrast, if the current state of utilization of the computing resources is high but the scheduled utilization will be low in the future, the first plan may be selected and scheduled for the future time when utilization drops. In yet another example, the current state of computing resources may indicate that additional high priority tasks are expected to be received even if the current state of utilization is low, and therefore the system may select the second plan so that spare capacity remains to process incoming high priority requests. These examples illustrate how various computing resource allocation plans may be selected based on the current state of the computing resources focusing on processing time, however other factors such as cost, access to critical resources such as databases or communication systems, or interruptions in availability due to maintenance may all be factored into the current state of the computing resources and used in the selection of a computing resource allocation for a given analysis request.

Using one or more of the factors discussed above, a computing resource allocation plan may be selected to perform the requested analysis while satisfying one or more performance constraints. In embodiments, the computing resource allocation plan is selected to provide a desired quality of service for the analysis request. In other embodiments, the computing resource allocation plan is selected to provide an optimal expected quality of service for the analysis request. The optimal expected quality of service may be the best expected quality of service of an identified set of possible allocation plans, or alternatively, the system may employ an optimization algorithm to identify an allocation plan that optimizes one or more performance metrics within the constraints of the system. In embodiments, a heuristic optimization method, such as a genetic algorithm, is employed to search for an optimal computing resource allocation plan among the various plans that may be constructed using the available computing resources.

Once a computing resource allocation plan is determined, computing resources are allocated to process the analysis request. The allocation of computing resources includes allocating designated hardware resources and software resources to process one or more analysis requests based on a determined computing resource allocation plan. If the request is to be processed in the future, the designated hardware resources and designated software resources are scheduled to process the analysis request at a determined time, such as during a period of reduced utilization of the computing resources. The scheduling of resources may also allow for rescheduling if a higher priority request is received and needs to be sequenced ahead of a lower priority request previously scheduled. The allocation of computing resources may also include initiating the analysis of the selected data. The analysis algorithm to be used may be specified in the request, or selected based on the type of request and the type of data. In some embodiments, a collection of predetermined analysis algorithms are provided and the analysis request includes an indication of one or more analysis algorithms to be applied to the selected data.

The methods of processing an analysis request may also be applied to a plurality of requests. In embodiments, a method further includes receiving a plurality of analysis requests. For each of the plurality of analysis requests, the method includes determining a computing resource plan for processing the analysis request based on the one or more parameters of the analysis request, and processing the analysis request using the determined computing resource allocation plan to provide analysis results corresponding to the analysis request. The analysis requests may originate from a single client that submits multiple requests, or from multiple clients each submitting one or more analysis requests. Each analysis request is processed as described above including the selection of a computing resource allocation plan and the allocation of computing resources to process the analysis request. When applied to multiple requests, whether from one or more clients, the method may also include selecting or optimizing the computing resource allocation plans for a plurality of analysis requests based on the parameters of two or more analysis requests. For example, a computing resource allocation plan may be selected for each request to provide a desired quality of service for a plurality of analysis requests to be processed. The method may therefore be applied to allocate resources in an efficient manner not only for an individual request, but also for multiple requests received by the system. In this manner, the methods described here achieve the technical effect of providing a situation-aware analytics system that intelligently allocates computing resources to process a plurality of analysis requests from a plurality of clients according to desired performance characteristics for each analysis request and the system as a whole.

By way of example, the application of the previously described systems and methods to a locomotive prognostic analysis is illustrated. This example is provided to further illustrate the system and methods disclosed herein without limiting the general description provided above. Referring to FIG. 1, the analytic router 10 receives a request from a monitored asset 14, which in this example is a locomotive. The request corresponds to a prognostic analysis that is intended to assess the health of the locomotive, and more specifically the health of the locomotive's cooling system. Cooling systems may develop leaks or other faults and assessing the health of such systems early is advantageous to avoid road failures or other unplanned downtime for the monitored asset. The locomotive sends a request for analysis to the analytic router 10. The request includes data selected for the particular prognostic analysis to be performed, which includes locomotive speed, engine speed, engine coolant pressure, and engine coolant temperature. The engine coolant may be water or other coolant appropriate for the application. The request also includes parameters corresponding to performance categories as previously discussed. In this example, the request time to process is a high priority (e.g., TIME=FAST), the cost for processing the request should be reduced (e.g., COST=LOW), and the accuracy required is a medium priority (e.g., ACCURACY=MEDIUM). Each of the parameters may be specified using indications such as fast/slow or high/low, or alternative, the parameters may be assigned a numeric value, such as one through ten. The request further includes the analysis to be performed on the selected data, which in this case is a three-day prognostic for engine coolant. A three-day prognostic is an analysis which determines the likelihood that given locomotive can be operated for three-days at an expected duty cycle without generating a low coolant failure. Such an analysis is particularly useful for selecting a locomotive for cross-country or other trips which require extended operation without maintenance.

The request as defined above is transmitted from the locomotive to the analytic router 10 to be processed. Upon receipt of the request, the mapper 16 determines a desired quality of service for the analysis request. In this example, the quality of service is measured on a scale from one to five, where one corresponds to the lowest quality of service, e.g., lowest urgency, minimal resource utilization allowed, and five corresponds to the highest quality of service, e.g. highest urgency, greatest resource utilization allowed. Based on the request specifying that time is a high priority, the mapper 16 determines that the quality of service for this request must be at least three. The mapper 16 may also access a quality of service configurations module 18 and determine that locomotive initiated prognostic requests require a quality of service of at least four. Using this information, the mapper 16 determines that the quality of service for this request must be at least four based on the parameters specified in the request and the type of request received. The relative importance of different parameters and the desired quality of service for different types of requests will depend on the intended use of the analytic router 10. The systems and methods disclosed here accommodate the different priorities associated with different applications and is therefore sufficiently flexible for use in analyzing requests associated with those multiple applications.

Also upon receipt of the request, the estimator 20 accesses the historical performance module 22 to determine computing resource plans suitable for processing the request. In one example, the estimator 20 identifies historical requests that most similarly match the current request, including consideration of the parameters specified in the current request. In one example, the estimator 20 identifies a historical request from a different locomotive that was processed three days prior to the current request and identifies the computing resources used to process that historical request. The estimator 20 also identifies ten other similar requests and compiles a list of computing resource allocation plans from this historical data.

The desired quality of service of at least level four determined by the mapper 16 and the computing resource configuration plans from the estimator 20 are communicated to the optimizer 24. In one example, the optimizer 24 may determine that 40% of similar historical requests were processed using quality of service level four, whereas 60% of similar historical requests were processed using quality of service level five. The optimizer may also determine the current state of the computing resources in the system, and determine that processing the current request using level five would be more expensive than processing the request using level four. The difference in cost could be because the request was received during a peak demand time, because the resources needed for a level five processing are currently in use processing other requests, or for other reasons which the optimizer may determine. Based on the combination of factors, the optimizer 24 selects a computing resource plan to provide a level four quality of service for the analysis request.

The resource provision module 26 allocates the computing resources, such as the hardware and software resources in the system, to process the analysis request based on the computing resource allocation plan determined by the optimizer 24. Once the computing resources are allocated, the analysis module 28 processes the request to produce the desired analysis results. The analysis results are then communicated back to the monitored asset 14, such as the locomotive. In this example, the analysis may correlate the loss of coolant pressure with one or more of the locomotive speed, engine speed and coolant temperature. Using this correlation and an estimate of the demand on the locomotive over the three-day period for the prognostic analysis, the analysis module may determine that the locomotive has a 98% probability of not experiences a coolant related fault during the three-day period. The locomotive operator or scheduler may then assess whether the given locomotive is sufficiently reliable to assign on a cross-country or extended trip. When similar analyses are performed for multiple locomotives, the locomotive scheduler may prioritize the locomotives for different assignments based on the relative health of the locomotives based on the prognostic analysis results.

The foregoing example is intended to further illustrate the application of the systems and methods presently disclosed for a specific type of analysis request. The system and method however are equally applicable to other types of requests and other types of assets, as well as user initiated analysis requests. As such, the system and method may be adapted to provide a flexible analytics system for maintenance and diagnostics of monitored assets.

In another embodiment, a method comprises receiving, over a communication channel, an analysis request to analyze selected data corresponding to one or more monitored assets. The analysis request may be received at an analytics routing system from a remote location, e.g., from a location not in the same facility as any part of the system. The analysis request includes one or more parameters corresponding to performance categories of computing resources for processing the analysis request. The method further comprises determining a computing resource allocation plan for processing the analysis request based on the one or more parameters, and processing the analysis request using the determined computing resource allocation plan to provide analysis results of the selected data. The method further comprises controlling the monitored assets based at least in part on the analysis results. For example, if the monitored assets are mobile vehicles, the vehicles may be scheduled and/or selected for particular missions based on the analysis results, and subsequently controlled for movement along one or more routes based on the schedule or otherwise for carrying out the missions. As noted above, if the analysis results for a particular vehicle indicate a fault, the vehicle may be controlled in response to the fault, including reducing the duty cycle or shutting down the vehicle.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be." The term "instructions" as used herein may refer to computer executable instructions.

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not different from the literal language of the claims, or if they include equivalent structural elements with insubstantial differences from the literal language of the claims.

What is claimed is:

1. A method comprising:
receiving an analysis request to analyze selected data corresponding to one or more monitored assets, wherein the analysis request includes one or more parameters corresponding to performance categories of computing resources for processing the analysis request; wherein the performance categories include a quality metric for the analysis request, wherein the quality metric relates to a desired accuracy of the analysis results;
determining a computing resource allocation plan for processing the analysis request based on the one or more parameters, wherein determining a computing resource allocation plan further includes selecting an analysis algorithm based upon the desired accuracy of the analysis results; and
processing the analysis request using the determined computing resource allocation plan to provide analysis results.

2. The method of claim 1, wherein processing the analysis request includes analyzing the selected data, and wherein the selected data is real-time monitoring data from the one or more monitored assets.

3. The method of claim 1, wherein the monitored assets are mobile assets.

4. The method of claim 1, wherein the performance categories include at least one of a time for processing the analysis request or a cost for processing the analysis request.

5. The method of claim 1, wherein determining the computing resource allocation plan for processing the analysis request further comprises:
determining a desired quality of service for the analysis request based on the one or more parameters.

6. The method of claim 5 further comprising:
determining the desired quality of service based on the one or more parameters specified in the analysis request.

7. The method of claim 5 further comprising:
determining the desired quality of service based on a correlation between request types and quality of service levels.

8. The method of claim 5, wherein determining the computing resource allocation plan for processing the analysis request further comprises:
determining two or more computing resource allocation plans for processing the analysis request and estimating a respective expected quality of service for processing the analysis request using each of the two or more computing resource allocation plans.

9. The method of claim 8, wherein the expected quality of service includes at least one of an expected time for processing the analysis request or an expected cost for processing the analysis request.

10. The method of claim 8, wherein determining the computing resource allocation plan for processing the analysis request further comprises:
selecting one of the two or more computing resource allocation plans based on at least the desired quality of service, the expected quality of service, or a current state of the computing resources.

11. The method of claim 10, wherein processing the analysis request further comprises:
allocating the computing resources to process the analysis request based on the selected one of the two or more computing resource allocation plans.

12. The method of claim 1, wherein determining the computing resource allocation plan for processing the analysis request further comprises:
determining one or more computing resource allocation plans for processing the analysis request and selecting one of the one or more computing resource allocation plans based on at least the one or more parameters and a current state of the computing resources.

13. The method of claim 1, wherein determining the computing resource allocation plan for processing the analysis request further comprises:
identifying a collection of hardware resources and software resources among the computing resources that are available and capable of performing the analysis request.

14. The method of claim 1, wherein determining the computing resource allocation plan for processing the analysis request further comprises:

determining the computing resource allocation plan based on the one or more parameters of the analysis request and historical performance results associated with prior analysis requests, wherein the historical performance results correspond to the performance categories of the computing resources in processing prior analysis requests.

15. The method of claim 1, wherein determining the computing resource allocation plan for processing the analysis request further comprises:
selecting the computing resource allocation plan to provide a desired quality of service for the analysis request and a plurality of additional analysis requests.

16. The method of claim 1, wherein determining the computing resource allocation plan for processing the analysis request further comprises:
determining a current state of the computing resources and optimizing the computing resource allocation plan based on the current state of the computing resources.

17. The method of claim 1, wherein processing the analysis request further comprises:
allocating designated hardware resources and designated software resources from among the computing resources to process the analysis request and a plurality of additional analysis requests based on the determined computing resource allocation plan.

18. The method of claim 1, wherein processing the analysis request further comprises:
scheduling designated hardware resources and designated software resources from among the computing resources to process the analysis request at a determined time.

19. The method of claim 1, further comprising:
receiving a plurality of analysis requests to analyze the selected data corresponding to one or more monitored assets, wherein each analysis request of the plurality of analysis requests includes one or more parameters corresponding to performance categories of computing resources for processing the analysis request;
wherein the method further comprises, for each analysis request of the plurality of analysis requests: determining a computing resource allocation plan for processing the analysis request based on the one or more parameters of the analysis request; and
processing the analysis request using the determined computing resource allocation plan to provide analysis results corresponding to the analysis request.

20. The method of claim 1, further comprising:
identifying a fault condition of a monitored asset in the one or more monitored assets based on the analysis results and notifying an operator of the monitored asset of the fault condition.

21. The method of claim 1, further comprising:
generating an alert if the analysis request cannot be processed in accordance with the one or more parameters of the analysis request.

22. A method comprising:
receiving an analysis request to analyze selected data corresponding to one or more monitored assets, wherein the analysis request includes one or more parameters corresponding to performance categories of computing resources for processing the analysis request;
determining a computing resource allocation plan for processing the analysis request based on the one or more parameters and based at least in part on a determined accuracy level of the analysis results; and
processing the analysis request using the determined computing resource allocation plan to provide analysis results.

* * * * *